United States Patent
Aleite et al.

[11] 3,933,580
[45] Jan. 20, 1976

[54] LIMIT REGULATION SYSTEM FOR PRESSURIZED WATER NUCLEAR REACTORS

[75] Inventors: Werner Aleite, Erlangen; Heinz-Wilhelm Bock, Erlangen-Bruck, both of Germany

[73] Assignee: Siemens Aktiengesellschaft, Berlin and Munich, Germany

[22] Filed: Apr. 9, 1973

[21] Appl. No.: 349,280

Related U.S. Application Data

[63] Continuation of Ser. No. 125,742, March 8, 1971, abandoned.

[52] U.S. Cl............................ 176/20 R; 176/24
[51] Int. Cl.² ................... G21C 7/00; G21C 17/00
[58] Field of Search......................... 176/20 R, 24

[56] References Cited
UNITED STATES PATENTS

| | | | |
|---|---|---|---|
| 3,253,994 | 5/1966 | Kägi | 176/20 R |
| 3,423,285 | 1/1969 | Curry et al. | 176/24 |
| 3,434,924 | 3/1969 | Pouderoux | 176/20 |
| 3,437,557 | 4/1969 | Kaipainen et al. | 176/20 R |

*Primary Examiner*—Stephen C. Bentley
*Assistant Examiner*—Thomas H. Webb
*Attorney, Agent, or Firm*—Herbert L. Lerner

[57] ABSTRACT

Limit regulation system for a pressurized water nuclear reactor in combination with a steam generating system connected to a turbine, the nuclear reactor having control rods as well as an operational regulation system and a protective system, includes reactor power limiting means operatively associated with the control rods for positioning the same and having response values between operating ranges of the operational regulation system, on the one hand, and response values of the protective system, on the other hand, and a live steam-minimal pressure regulation system cooperating with the reactor power limiting means and operatively connected to a steam inlet valve to the turbine for controlling the same.

7 Claims, 3 Drawing Figures

LIMIT REGULATION SYSTEM FOR PRESSURIZED WATER NUCLEAR REACTORS

This is a continuation, of application Ser. No. 125,742, filed Mar. 18, 1971, now abandoned.

Our invention relates to limit regulation system for pressurized water nuclear reactors.

In nuclear power plants with pressurized water reactors, normal operation is assured by means of operational regulation systems. These operational regulation systems, on the reactor side of the power plant, are made up essentially of the coolant temperature regulation system and the rod bank position regulation system, which act on and control the position of the control rods and the supply and withdrawal of boron, and on the turbine side is made up of the generator power regulation system, by which the turbine valves are adjusted. These regulating systems also take care of relatively minor operational disturbances or mishaps. Major disturbances are detected so early by an additionally provided protective system that damage is capable of being averted by the immediate institution of suitable countermeasures. This protective system is formed of the reactor protection system and a turbo-generator protection system through which, upon the occurrence of major disturbances or mishaps, the turbine and reactor is generally shut down.

So-called "medium-size" disturbances or disruptions can occur, however, such as, for example, due to an inadvertent actuation of a bypass station by which part of the generated steam is blown down or discharged under pressure into a condenser due to a preheater breakdown, due to bleeding or withdrawal of super steam or the like, which cannot be detected by the normal operational regulation system or perhaps actually can no longer be controlled, yet does not warrant shut-down of the reactor.

It is therefore an object of our invention to provide limit regulation system for pressurized water reactors, at the response or actuation of which auxiliary measures are encountered which assist the performance of the operational regulation systems and thereby reduce the number of rapid shutdowns.

With the foregoing and other objects in view, we provide in accordance with the invention, limit regulation system for pressurized water nuclear reactor in combination with a steam generating system connected to a turbine, the nuclear reactor having control rods as well as an operational regulation system and a protective system, comprising reactor power limiting means operatively associated with the control rods for positioning the same and having response values between operating ranges of the operational regulation system, on the one hand, and response values of the protective system, on the other hand, and a live steam-minimal pressure regulation system cooperating with the reactor power limiting means and operatively connected to a steam inlet valve to the turbine for controlling the same.

This limit regulation system thus responds, for example, in a specific interval above the range which is responded to by the normal operational regulation system, yet below the response of the protective system. For example, upon the occurrence of a disturbance or perturbation an increased reactor power output is demanded and, upon continuance thereof, a fast shut-down of the reactor would have been carried out by the heretofore known protective system. The limit regulation system of the invention, however, limits the power increase by immediately inserting the control rods more deeply into the reactor core and consequently reducing the power to such extent that the disturbances are eliminated.

In accordance with another feature of the invention, such reactor power limit regulation system is made functionally dependent upon the measurement of neutron flux and, in fact, either upon the local or mean value measurements within the reactor or measurements outside the reactor.

In accordance with a further feature of the invention, the reactor power limit regulation system is made functionally dependent upon the boiling point difference. Also, in this case, integral or local criteria are employed.

In accordance with yet another feature of the invention, the live steam-minimal pressure regulation system cooperating with the reactor power limit regulation system is provided with means for transmitting a shut-down command to the turbine inlet valve when a predetermined limit value of the live steam pressure is exceeded.

Other features which are considered as characteristic for the invention are set forth in the appended claims.

Although the invention is illustrated and described herein as embodied in limit regulation system for pressurized water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
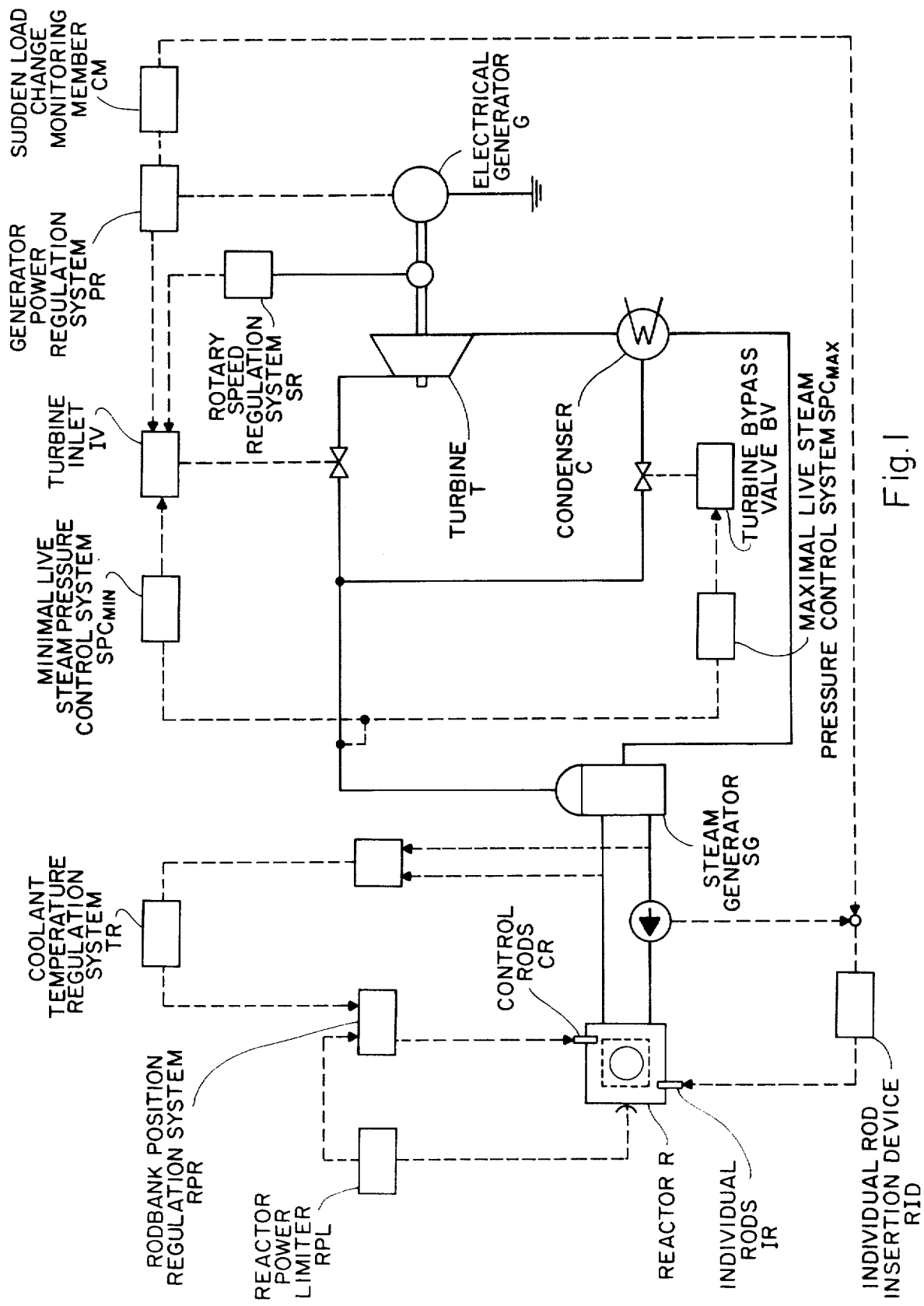
FIG. 1 is a schematic diagram of the operational and limit regulation systems for a pressurized water reactor according to the invention.

Referring now to the drawing and first particularly to FIG. 1 thereof, there is shown therein the various regulation systems for the entire nuclear power plant. The nuclear part thereof is formed of the reactor R and the primary side of the steam generator SG while the steam power plant part thereof is formed of the secondary side of the steam generator SG, the turbine T with the electrical generator G and the condenser C coupled thereto, with feedwater being returned from the latter to the steam generator SG.

The operational regulation systems are represented as generator power regulation system PR and coolant temperature regulation system TR. The delivered power of the entire power plant is adjusted by the generator power regulation system PR which uses the hydraulic control drives IV of the turbine inlet valve as control members. The reactor power follows the generator power with the coolant circulatory loop delay. Therefore in the case of pressurized water reactors, it is unnecessary to determine and regulate the reactor power proper. Due to the large thermal storage capacity of the primary coolant loop it is rather of advantage to control constantly and independently of load the coolant temperature of the reactor at a mean value. This is effected by means of the coolant temperature regulation system TR, which is used through the rodbank position regulation system RPR of the control rods CR of the reactor as control members.

With the aforedescribed regulation devices it is essentially possible to carry out all guaranteed load changes (with the exception of releasing the load altogether) without endangering the power plant. In order to control disturbances such as, for example, failure of the operational regulation systems or disturbances against which the control members of the operational control are inadequately effective or which they cannot detect, without shutting down the reactor however, there is provided in accordance with our invention, a limit regulation system operating between the operating range of this operational regulation system and response values of the protective system. This limit regunation is formed of the reactor power limiter RPL, a regulator specially provided per the present invention which acts upon the control rods CR directly through the rodbank position regulation system RPR, and a minimal pressure regulation system $SPC_{MIN}$, also provided per the present invention. The system $SPC_{MIN}$ exercises a control action on the turbine inlet valve of the turbine T via hydraulic drive system IV, this control action on the system IV being additional to the action of the generator power regulation system PR.

The reactor power limiter RPL is dependent upon the neutron flux measurement which is indicated symbolically in FIG. 1 by the broken-line connection between the units R and RPL. The quasiarrow in that broken line, adjacent the left edge-line of the unit R, is symbolic of a neutron-flux probe which senses the flux. The neutron flux can be registered as a total measurement locally or averaged in the reactor core proper or also outside the reactor. If the response value of this regulation in the power operation is then set above the neutron flux maximum for all operational cases, it can then be operated as limit power regulation of the reactor.

Another possible way of deriving the response values for the reactor power limiter RPL of the present invention is the "boiling-point difference" measurement. Since, in every operational instance for pressurized water reactors, film boiling on the tubes of the fuel rods must be avoided, with the boiling-point difference measurement, the temperature of the coolant at its outlet from the reactor is measured (in FIG. 1, unit CR) and, therefrom, the respective boiling pressure i.e. the pressure at which the coolant would transform into a film of steam at the existing temperature, is calculated. This calculated boiling pressure is compared with the existing operational pressure and then, when a predetermined difference value therebetween is exceeded, the reactor power limiter is activated.

The mode of operation of the reactor power limiter RPL of the present invention, in the case of a special mishap or disturbance is as follows: the reactor power is follow-up controlled in normal operation by the generator power by means of the coolant temperature control system TR and the rod control system RPR, so that steam of adequate quality is always available. The coolant temperature regulation system. This regulation system cannot determine, however, if too much power is being demanded by the reactor because, for example, at 100% generator power, additional quantities of steam are being removed such as, for example, due to support steam bleeding or withdrawal for feedwater vessels, failure or breakdown of feedwater preheaters, failure to open the valve at the by-pass station and the like. In all of these cases, an overload of the reactor can be avoided because the reactor power limiter RPL will be activated. Its regulating action returns the reactor power to that which is required for the nominal or rated generator power value and thereby effects a reduction in the live-steam pressure when the reactor power withdrawal is too great.

This reduction in live-steam pressure is sensed by the live-steam minimal pressure regulation system $SPC_{MIN}$, specially provided per the present invention. The system $SPC_{MIN}$ becomes effective, when a predetermined minimum pressure value is no longer attained. When becoming effective, the system $SPC_{MIN}$ closes the turbine inlet valve sufficiently until the live-steam pressure due to reactor power reduction has again assumed permissible values corresponding to the new operating condition.

Due to this activation of the reactor power limiter RPL, as per the present invention, the regulation concept of the nuclear power plant is thus reversed relative to the normal regulation flow, for a period of time. The reactor R then predetermined the generator power, and the generator G removes the existing steam quantity; whereas, during normal operation, the generator G demands a specific quantity of steam and the reactor R meets this demand by regulation of the mean coolant temperature via system TR.

So far, there have been described conventional regulatory schemes, and regulatory schemes per the present invention. In addition to these aforedescribed systems, the the systems and devices SR, CM, RID, per se conventional, are provided to produce emergency reactor shut-down. The device SR is a rotary speed regulation system of the generator G. The system DR at no-load, operates as maximal rotary speed regulation system and acts upon or controls the turbine valve; control system IV, the emergency shut-down action, is merely indirect and via systems CM and RID. The system CM responds to sudden generator load changes; the system RID responds to the system CM or to pump failure—note the input to unit RID from the pump shown symbolically by arrow in the primary loop of unit SG. In either case, the system RID inserts a single control rod into the reactor R, thereby shutting it down.

As security against too-high steam pressure in the live steam line, for example, when the turbine inlet valve is suddenly closed by the system IR, the present invention avails itself of system $SPC_{MAX}$, a maximal pressure regulation system $SPC_{MAX}$, which effects opening of valves of a by-pass station BV so that the live steam flows off directly into the condenser C.

Figure 2:
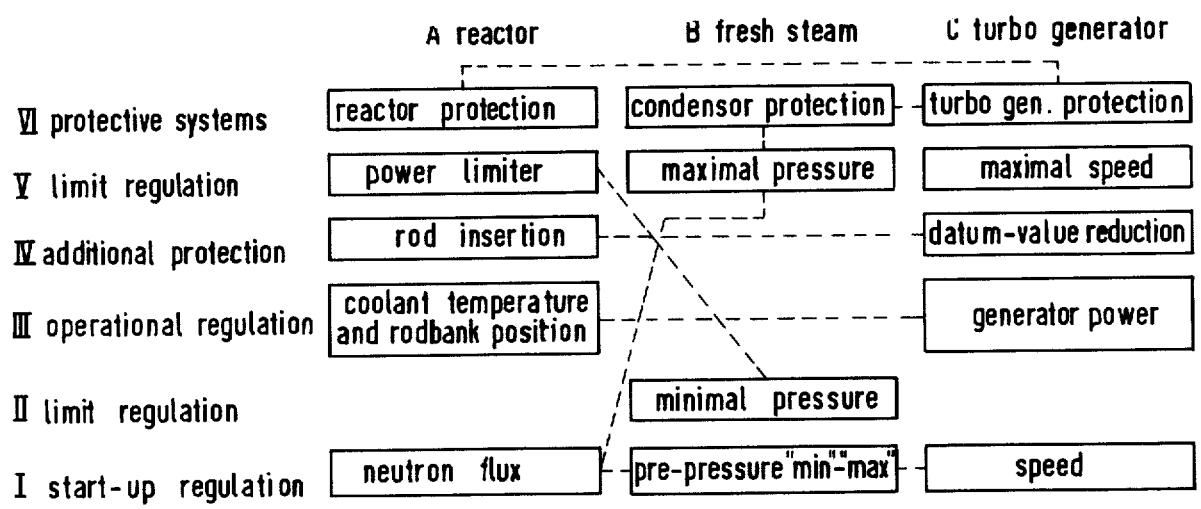
FIG. 2 is a chart for the graduation or staggering of the various regulation and protection systems.

In FIG. 2 there is shown in schematic view, a table or chart of all of the regulation devices or systems, with broken lines indicating the cooperation of the respective devices or systems as well as the staggering or graduation of the activation thereof with respect to the protective measures for the various power plant sections. In column A, the measures in the nuclear reactor section are listed, in column B, the measures in the steam section, and in column C, those in the turbogenerator section. If this chart of FIG. 2 is considered row-by-row from the bottom to the top thereof, the staggering or graduation of the individual regulation and protective measures is readily noted. Initially, in the lowest row I of FIG. 2, the start-up regulation system devices are represented and are made up of a neutron flux regulation system in the reactor section, as well as a pre-pressure regulation system with the aid of corresponding minimal and maximal pressure regulation systems $SPC_{MIN}$ and $SPC_{MAX}$ in the live steam section. As to the turbogenerator section, the rotary speed regulation system SR is applicable.

In the horizontal row III of FIG. 2 the previously described operational regulation systems are shown, namely the coolant temperature regulation system TR with the control rod bank position regulation system RPR dependent thereon which cooperate with the generator power regulation system PR. Applicable as additional or supplementory measures for operational regulation, are the single rod insertion means RID for rapid power reduction of the reactor power and the means for reset or restoration to the datum or rated generator power (not shown in FIG. 1).

In row V are presented the actions of limiting ractor power, but without shutdown of the reactor R, in accordance with the present invention. These limit regulation systems are made up of the reactor power limiter RPL which cooperates with the live-steam minimal pressure regulation system $SPC_{MIN}$, as well as the maximal pressure regulation system $SPC_{MAX}$ at excess pressure in the live steam line, and the maximal rotary speed regulation system SR at excess rotary speed of the generator. In the uppermost row VI of FIG. 2, the protective systems are indicated, which generally effect a rapid shut-down of the reactor and turbine. These protective systems consist of a reactor protection system and a turbo-generator protection system cooperating therewith, as well as a condenser protection system, none of these being shown in FIG. 1.

From the aforedescribed schematic diagram or table of FIG. 2, it is thus clearly apparent that all operational situations of the nuclear power plant can be reliably controlled with suitable regulation or protective devices or systems.

Figure 3:
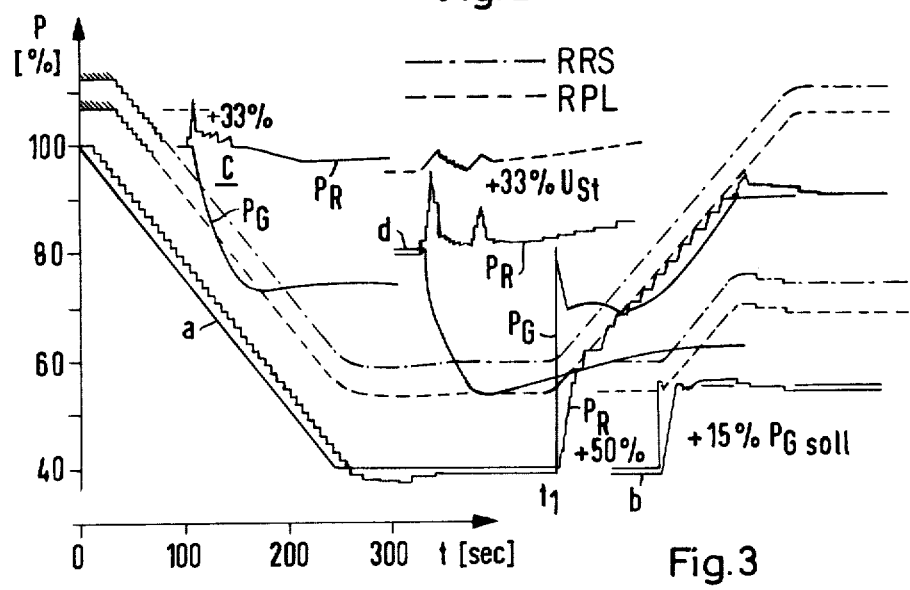
FIG. 3 is a plot diagram of the power curve of reactor and generator under the control of the limit regulation systems.

The mode of operation of the reactor power limiter for various disturbances is represented in the plot diagram of FIG. 3. In the diagram of FIG. 3, the power P is plotted against the respective regulation time interval t in seconds. The dash-dot line RRS represents the nominal or rated value of aforementioned systems which contribute to rapid shut-down these will hereinafter be collectively considered as a rapid shut-down system RRS. It is assumed in this diagram that the reactor power limiter RPL is activated when the power is at about 105%, and the reactor rapid shut-down system RRS is activated when the power is at about 115%. In the curve a, there is shown initially a power reduction with a permissible load removal slope of from 100% to 40%, in about 250 seconds, the desired reactor power value being follow-up controlled under the assumed conditions of permissible reduction, primarily by and the generator power. After the required minimum load of 40% has reached equilibrium, assume that at time $t_1$, an upward load leap of 50% is demanded. Such a sudden increase in desired value of the total power of the power plant is beyond the maximal permissible power-varying speed of the reactor. The reactor power consequently attempts, at first, to follow the required value of the generator power but is prevented, however, from further increasing, when it attains the threshold value for action of the reactor power limiter RPL, due to the cooperation thereof with the minimal pressure regulation system $SPC_{MIN}$. Reactor power can be increased only along the permissible sloping load line and the respective increase of the demanded value of the reactor power limiter. In this manner, the aforedescribed reversal of the regulation concept of the nuclear power plant is effected, in that, in this case, the reactor dictates to the generator how much electrical generate, until the reactor R has again started up and reached the desired nominal or rated value of the generator power; and by that time the entire regulation system will again have become primarily dependent on the generator power regulation system.

In curve b, a power leap of 15% is shown, which is, below the threshold value for activating of the reactor power limiter, so that the reactor power can build up to the new nominal or rated power without hindrance.

In curve c, it is assumed that an operational disturbance has occurred due to a faulty 35% opening of a by-pass station B at full-load. Since a higher power release is simulated or feigned to the reactor R due to direct by-passing of the live steam to the condenser C, the reactor R attempts to follow up such increased power. A limiting of the reactor power accordingly results, however, for an increase of 5%, due to the reactor power limiter RPL, as well as a simultaneous withdrawal of the generator power due to the action of the minimal pressure regulation system $SPC_{MIN}$, which resets the inlet valve of the turbine via system IV. By limiting the reactor power and by the activation of the minimal pressure regulation system, a shutdown of the reactor is thus avoided because no immediate danger exists, but rather only a defective response of the by-pass station.

In curve d, there is also a case of a faulty opening as in curve c, of 35% however, the faulty opening occurs here for a power of 80%. Since, on this occasion, the threshold value for action of the reactor power limiter is above the actual reactor power, the reactor power can initially follow-up fully the newly required power value while, due to the response of the minimal pressure regulation system $SPC_{MIN}$, there occurs reversion to the generator power and accordingly also finally to the reactor power.

With this aforedescribed limit regulation system, which is effective between the operational regulation system and the protective system, it is thus possible, in the event of a disturbance which demands an increased reactor power and, which would otherwise result in rapid shut-down of the reactor, to limit this increase in power by inserting the control rods and consequently reduce the power to such an extent that the reactor will recover to a normal condition without shutdown.

We claim:

1. In a system for controlling by turbine inlet valves and control rods power delivered by a nuclear reactor of a nuclear power plant of the pressurized water type, the plant including a steam turbine, a turbogenerator, operating control means for controlling the system in the normal working range, and emergency means to shut down the reactor; the improvement comprising means to control intermediate disturbances in the range between and not controlled by the operating control means and the shut down means, minimal steam pressure control means for controlling the turbine inlet valves when the steam pressure drops below a certain value, turbogenerator protecting means, maximal steam pressure control means connected for activating the turbogenerator protecting means when the steam pressure exceeds a predetermined value, reactor protecting means and reactor control means for activating the reactor protecting means when the reactor output exceeds a predetermined value, a power controlling system comprising a rod control system responsive directly to reactor coolant temperature means to position control rods and thereby control reactor output, and a reactor power limiting system for taking over control of the system to control the action of the rod control system when a limit value which is below the value of the reactor output which controls the activation of the reactor protecting means is exceeded thereby limiting the reactor output power to a permissible value via the control rods.

2. A power controlling system according to claim 1, wherein said reactor power limiting system has means responsive to sensed neutron flux measurement.

3. A power controlling system according to claim 2, wherein the neutron flux is obtained from measurement means within the core of the reactor.

4. A power controlling system according to claim 2 wherein the neutron flux is obtained from measurement means outside the reactor.

5. A power controlling system according to claim 1, wherein said reactor power limiting system has means responsive to sensed boiling pressure.

6. A power controlling system according to claim 2, wherein the minimal steam pressure control means has means responsive to the power limiting system to control the turbine inlet valves.

7. A system according to claim 6, wherein the minimal steam pressure control means comprises means for transmitting a shut-down command to said inlet valve when a predetermined minimum threshold value of the live steam pressure is not attained.

* * * * *